(12) United States Patent
Becker et al.

(10) Patent No.: US 10,660,254 B2
(45) Date of Patent: May 26, 2020

(54) FRAME AND LEVELING ASSEMBLY FOR AGRICULTURAL IMPLEMENT

(71) Applicant: Deere & Company, Moline, IL (US)

(72) Inventors: Shawn J. Becker, Centralia, KS (US); Mark D. Beeck, Ankeny, IA (US); Andrew J. Peterson, Ankeny, IA (US); Jarrod R. Ruckle, Bondurant, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/998,824

(22) Filed: Aug. 15, 2018

(65) Prior Publication Data

US 2020/0053943 A1   Feb. 20, 2020

(51) Int. Cl.
*A01B 63/22* (2006.01)
*A01B 59/042* (2006.01)
*A01B 73/04* (2006.01)

(52) U.S. Cl.
CPC ............ *A01B 63/22* (2013.01); *A01B 59/042* (2013.01); *A01B 73/044* (2013.01)

(58) Field of Classification Search
CPC ...... A01B 63/22; A01B 59/042; A01B 73/044
See application file for complete search history.

(56) References Cited

U.S. PATENT DOCUMENTS

| | | | | |
|---|---|---|---|---|
| 1,685,278 A * | 9/1928 | Dwyer | .................... | A01B 21/08 172/141 |
| 2,320,742 A * | 6/1943 | Newkirk | ................ | A01B 21/08 172/328 |
| 2,344,123 A * | 3/1944 | Brown | .................... | A01B 61/02 172/318 |
| 2,589,896 A * | 3/1952 | Toland | .................... | A01B 63/32 116/285 |
| 3,583,284 A * | 6/1971 | Ryan | ....................... | A01B 39/19 91/189 R |
| 3,583,495 A * | 6/1971 | Cantral | .................. | A01B 63/22 172/316 |
| 3,731,747 A * | 5/1973 | Frank | .................... | A01B 21/083 172/311 |
| 3,757,871 A * | 9/1973 | Maust, Jr. | .............. | A01B 49/02 172/178 |
| 3,777,823 A * | 12/1973 | Holfeld | .................. | A01B 63/22 172/328 |

(Continued)

*Primary Examiner* — Tara Mayo-Pinnock
(74) *Attorney, Agent, or Firm* — Michael Best & Friedrich LLP (57) ABSTRACT

A tillage implement includes an implement frame having a first lengthwise frame member, a second lengthwise frame member, and a lateral frame member connected to and extending between the first and second lengthwise frame members. A hitch assembly is rotatably connected to the implement frame. A wheel assembly is connected to the implement frame and moveable between a raised position and a lowered position. A rockshaft is rotatably connected to the implement frame and connected to the wheel assembly. A leveling assembly is connected to the implement frame, the rockshaft, and the hitch assembly. The leveling assembly is configured to adjust the position of the hitch assembly based on movement of the rockshaft. The leveling assembly includes an actuator connected to and aligned with a leveling link.

20 Claims, 6 Drawing Sheets

(56) References Cited

U.S. PATENT DOCUMENTS

| | | | | |
|---|---|---|---|---|
| 4,108,249 | A | * | 8/1978 | Anderson .............. A01B 63/22 172/328 |
| 4,198,921 | A | * | 4/1980 | Horton ................ F15B 15/2846 116/283 |
| 4,306,732 | A | * | 12/1981 | Pettibone ............. B62D 61/125 172/327 |
| 4,428,435 | A | * | 1/1984 | Hubbard ................ A01B 63/22 172/328 |
| 4,450,917 | A | * | 5/1984 | Hake ...................... A01B 63/22 172/328 |
| 4,606,413 | A | * | 8/1986 | Hake ...................... A01B 63/22 172/328 |
| 4,809,786 | A | * | 3/1989 | Hoehn ................... A01B 21/08 172/316 |
| 4,932,476 | A | * | 6/1990 | Hoehn ................... A01B 21/08 116/281 |
| 5,992,535 | A | * | 11/1999 | Bierl .................... A01B 63/166 172/328 |
| 6,679,339 | B1 | * | 1/2004 | Steinlage ............... A01B 63/22 172/395 |
| 2010/0282481 | A1 | * | 11/2010 | Tamm .................. A01B 29/041 172/311 |
| 2013/0255974 | A1 | * | 10/2013 | Scherman ............. A01C 7/208 172/1 |
| 2017/0079190 | A1 | | 3/2017 | Steinlage et al. |
| 2017/0079197 | A1 | | 3/2017 | Steinlage et al. |
| 2018/0153089 | A1 | | 6/2018 | Sporrer et al. |

* cited by examiner

FRAME AND LEVELING ASSEMBLY FOR AGRICULTURAL IMPLEMENT

FIELD

Various exemplary embodiments relate to tillage equipment.

BACKGROUND

Agricultural implements and machines, such as various plows, tillers, rippers, seeders, nutrient applicators, etc., are used to work soil of crop fields. Tillage and other agricultural implements can perform a variety of tasks, such as breaking up tough ground, injecting nutrients into the ground, and leveling the ground. Such implements are commonly towed behind work vehicles, such as tractors, and can be outfitted with a variety of ground-engaging tools, such as shanks, disks, harrowing tools and finishing tools, depending on the ground preparation operation being carried out.

SUMMARY

According to an exemplary embodiment, a tillage implement is configured to be towed behind an agricultural vehicle. The tillage implement includes an implement frame having a first lengthwise frame member, a second lengthwise frame member, and a lateral frame member connected to and extending between the first and second lengthwise frame members. A hitch assembly is rotatably connected to the implement frame. A wheel assembly is connected to the implement frame and moveable between a raised position and a lowered position. A rockshaft is rotatably connected to the implement frame and connected to the wheel assembly. Movement of the wheel assembly between the raised position and the lowered position causes rotation of the rockshaft. A leveling assembly is connected to the implement frame, the rockshaft, and the hitch assembly. The leveling assembly is configured to adjust the position of the hitch assembly based on movement of the rockshaft. The leveling assembly includes an actuator connected to and aligned with a leveling link.

According to an exemplary embodiment, a tillage implement is configured to be towed behind an agricultural vehicle. The tillage implement includes an implement frame and a hitch assembly rotatably connected to the implement frame. A wheel assembly is connected to the implement frame and moveable between a raised position and a lowered position. A rockshaft is rotatably connected to the implement frame and connected to the wheel assembly. Movement of the wheel assembly between the raised position and the lowered position causes rotation of the rockshaft. A fore leveling link is connected to the hitch assembly. A leveling arm is connected to the fore leveling link and the implement frame. A leveling actuator is connected to the leveling arm. The leveling actuator has a moveable piston extending from a first end and a projection extending from a second end. An aft leveling link is connected to the actuator and to the rockshaft. At least a portion of the projection extends inside of the aft leveling link. The position of the hitch assembly is adjusted based on movement of the rockshaft, and on movement of the piston.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Various agricultural machines (e.g., seeders, sprayers, primary and secondary tillage implements, and so on) have very wide platforms for mounting various tools or material dispensing components for working crop fields. To allow for transport on roadways, the implements may be formed in sections, one or more of which are able to fold inward alongside or above a main fame of the implement, which has a controlled (e.g., regulated) width or lateral dimension. The sections may be hinged together and rotate with respect to one another between an operational position, in which the outer frame sections are generally parallel with the main frame section, and a transport position, in which the outer sections are folded up and/or over the main frame section. An implement may have as few as one main frame section and one outer section, or it may have several outer sections, such as multiple outer sections on each side of the main frame section.

Figure 1:
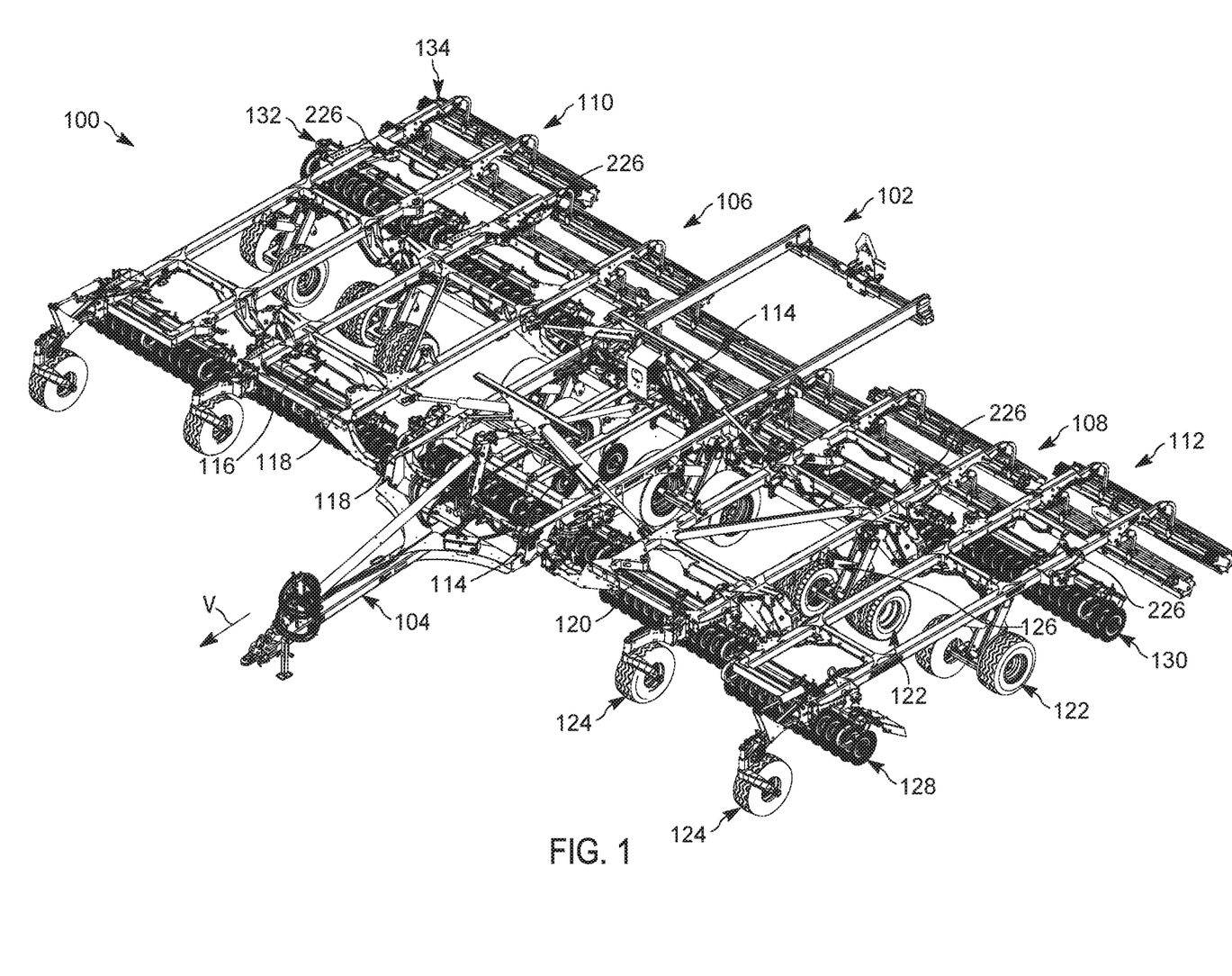
FIG. 1 is a perspective view of an exemplary tillage implement.
Figure 2:
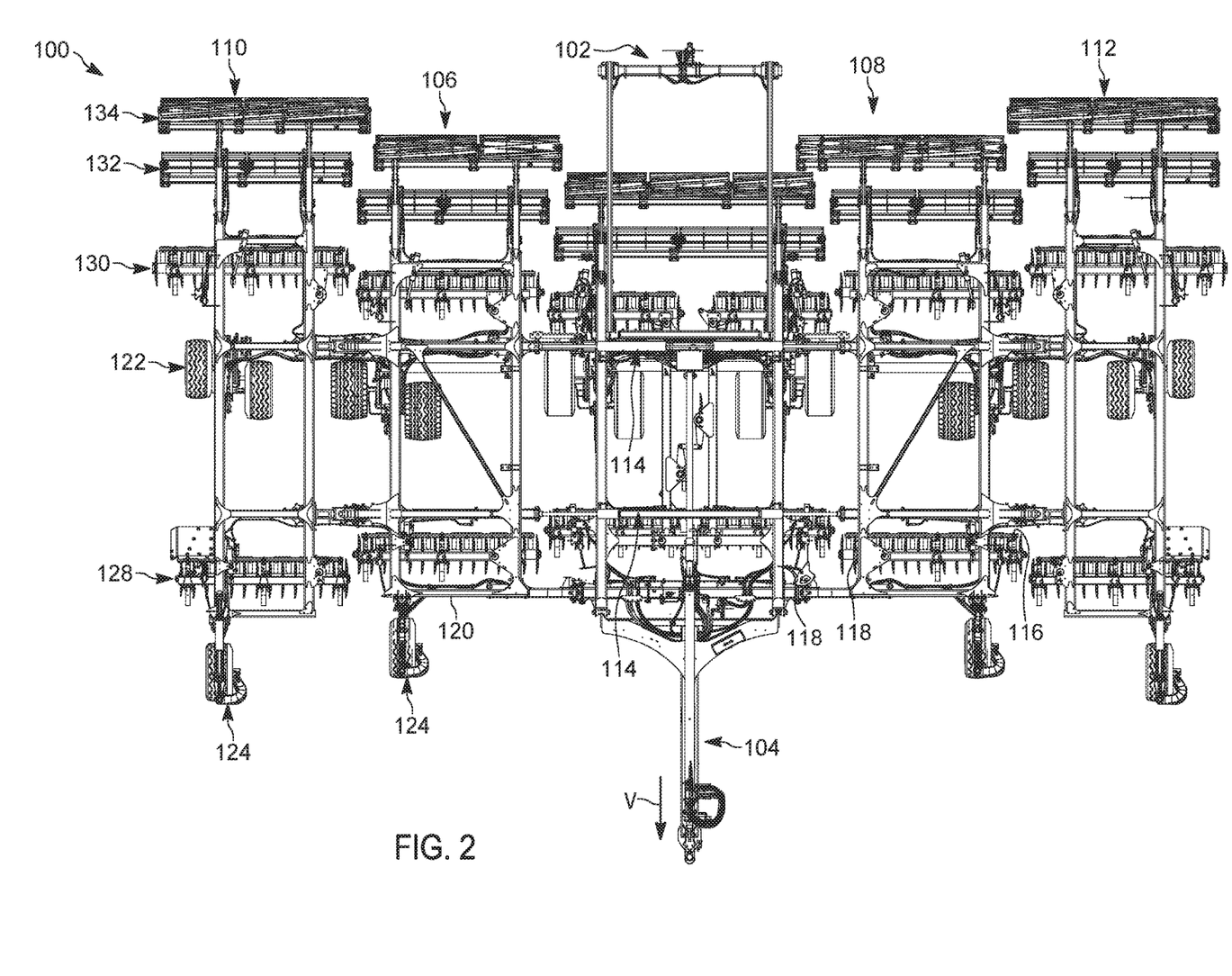
FIG. 2 is a top view of FIG. 1.

FIGS. 1 and 2 illustrate an agricultural implement 100 embodied as a tiller. The implement 100 is designed to couple to a work machine and be moved over an area. For example, the implement 100 can be coupled to a tractor, and dragged behind the tractor over a field. The implement 100 includes work tools that perform different operations, for example aerating the soil before planting or uprooting weeds after planting. Different types of tools can be attached to the implement 100 based on the desired operation.

The agricultural implement 100 includes a main frame 102. The main frame 102 is coupled to a hitch assembly 104, for example a three-point hitch or a drawbar attachment. The hitch assembly 104 extends longitudinally in a direction of travel V for coupling to the work machine.

A plurality of frame sections (i.e. wings) can be connected to the main frame 102. In the illustrated five section configuration, a first inner wing 106, second inner wing 108, first outer wing 110, and second outer wing 112 are connected to the main frame 102. The first inner wing 106 is disposed to one side of the main frame 102, and the second inner wing 108 is disposed on an opposite side of the main frame 102. The first outer wing 110 is disposed to the outside of the first inner wing 106 and the second outer wing 112 is disposed to the outside of the second inner wing 108.

While FIG. 1 represents an illustrated embodiment of an agricultural implement with five frame sections, this disclosure is not limited to this embodiment. Other embodiments may include only three sections with a main frame and two outer frames. Still other embodiments can include only a main frame section without any wing sections. Alternatively, there may be more than five frame sections.

Each frame section can be rotatably coupled to the frame section adjacent thereto. For example, the first inner wing 106 is rotatably coupled to the main frame 102 and the first outer wing 110. Similarly, the second inner wing 108 is rotatably coupled to the main frame 102 and the second outer wing 112. The outer wing sections 110, 112 can fold inward approximately 180 degrees to be positioned on top of the inner wing sections 106, 108, respectively. The inner wing sections 106, 108, and the folded outer wing sections 110, 112, then fold inward approximately 90 degrees so that the inner wings 106, 108 and outer wings 110, 112 are near perpendicular to the main frame 102.

The agricultural implement 100 can include a plurality of actuators for controlling rotation and folding of the frame sections. Each actuator may be a hydraulic actuator, electric actuator, or any other known actuator. Moreover, each actuator may include an outer body or cylinder in which a rod or piston moves between an extended position and a retracted position. As will be understood, the hydraulic cylinder may be coupled, via various hydraulic fluid carrying lines, to a hydraulic pump on board the towing vehicle. Also on board the towing vehicle may be one or more controllers having processors and memory architecture for controlling the position of various electro-hydraulic valves, which may be connected to the controller(s) directly or by a suitable bus and which control the extension and/or the retraction of the cylinder piston.

The main frame 102 includes a pair of inner wing folding actuators 114. The inner wing folding actuators 114 include cylinders connected to the main frame 102 and pistons connected to one of the inner wing frames. A first set of pistons are connected to the first inner wing 106 and a second set of pistons are connected to the second inner wing 108. Each of the inner wings 106, 108 include a pair of outer wing folding actuators 116. The outer wing folding actuators 116 include cylinders connected to the inner wing frames and pistons connected to one of the outer wing frames. By extending and retracting the respective pistons, the different frame sections can be folded or unfolded as needed.

Each of the frame sections includes a plurality of frame members, such as hollow metal or non-metal tubes or beams. The frame members may be interconnected (e.g. bolted, welded), providing a framework to which an array of tillage tools and other components may be mounted. In the example shown, the frame sections include a pair of spaced lengthwise frame members 118 having a length extending in the direction of travel V and two or more lateral frame members 120 coupled to, and extending between, the lengthwise frame members 118. The lateral frame members 120 can extend substantially parallel to the direction of travel V. The size and spacing of the frame members can vary depending on the desired length and width of the implement.

Each of the frame sections can be supported by one or more wheels. For example, the implement 100 can utilize one or more sets of center wheels 122 and one or more front wheels 124. In the illustrated embodiment, two sets of center wheels 122 are connected to the lengthwise frame members 118 of the main frame 102, a single set of center wheels 122 are connected to each of the inner wings 106, 108 and the outer wings 110, 112, and a front wheel is connected to each of the inner frames and outer frames. In some embodiments, there may be only a single wheel supporting each frame section. In a different embodiment, there may be more than a pair of wheels supporting each frame section. Moreover, there may be back wheels disposed near the rear of the implement for additional support.

Height adjustment actuators 126 are used to control the height of the frame sections relative to the center wheels 122, and thus adjust the height of the frame section relative to the ground. The height adjustment actuators 126 have a cylinder connected to the respective frame section and a piston connected to a mounting arm associated with the center wheels 122. Extension and retraction of the cylinder raises or lowers the wheels 122 relative to the respective frame section. The height adjustment actuators 122 are dual-acting hydraulic actuators, although other known actuators can be used. As discussed above, the height adjustment actuators 122 can be coupled to a pump via various hydraulic fluid carrying lines, and controlled by one or more controllers.

A plurality of tool assemblies are coupled to the frame sections for engaging a ground surface or soil upon which the implement 100 travels. The illustrated embodiment includes a first set of disk harrow gang assemblies 128, a second set of disk harrow gang assemblies 130, a first roller basket assembly 132, and a second roller basket assembly 134 attached to each frame section. Different tool assemblies, including tillers and rank tines, can also be connected to the frame sections. The tools can be releasably secure to the frame section so that different tools can be swapped in and out as needed.

Figure 3:
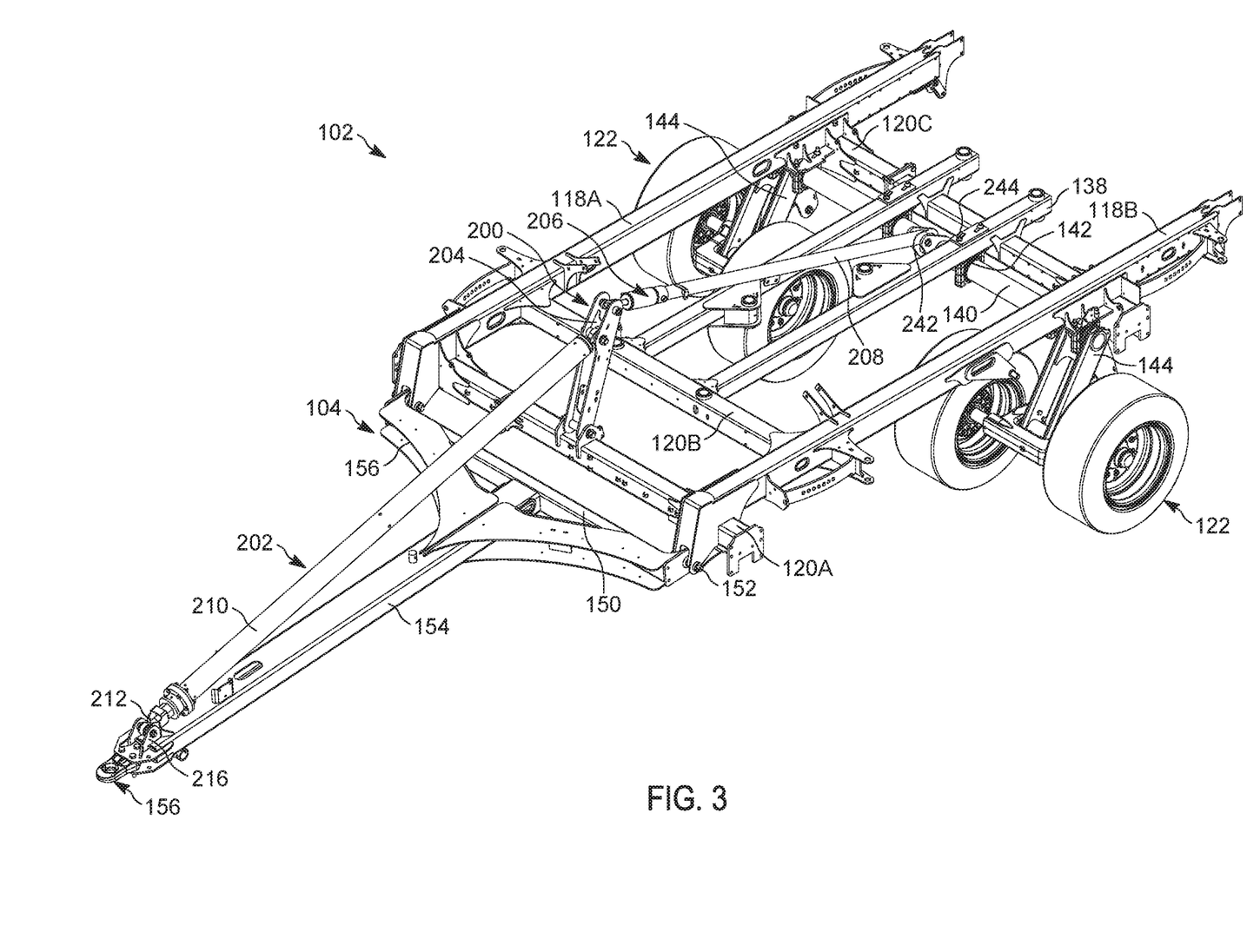
FIG. 3 is a perspective view of a portion of a main frame section shown in FIG. 1.

FIG. 3 shows portions of the main frame 102 and the hitch assembly 104. The main frame 102 includes a first lengthwise frame member 118A, a second lengthwise frame member 118B, a front lateral frame member 120A, a medial lateral frame member 120B, and a rear lateral frame member 120C. A pair of sub-frame members 138 extend in the direction of travel V and are connected to the medial lateral frame member 120B and the rear lateral frame member 120C. A rockshaft 140 is rotatably connected to the sub-frame members 138 by a pair of bearing assemblies 142. The rockshaft 140 is rotatably fixed to the support arms 144 of the center wheel assemblies 122.

The hitch assembly 104 includes a cross frame member 150 rotatably connected to the main frame 102. The rotatable connection includes a set of pins 152 that extends through openings in the lengthwise frame members 118A, 118B 118A, 118B and the cross frame member 150. A hitch frame member 154 extends from the cross frame member 150 in the direction of travel V. A pair of side braces 156 connect to the hitch frame member 154 and the cross frame member 150. The free end of the hitch frame member 154 includes a tongue assembly 156 having an opening for receiving a hitch pin on a work vehicle.

Figure 4:
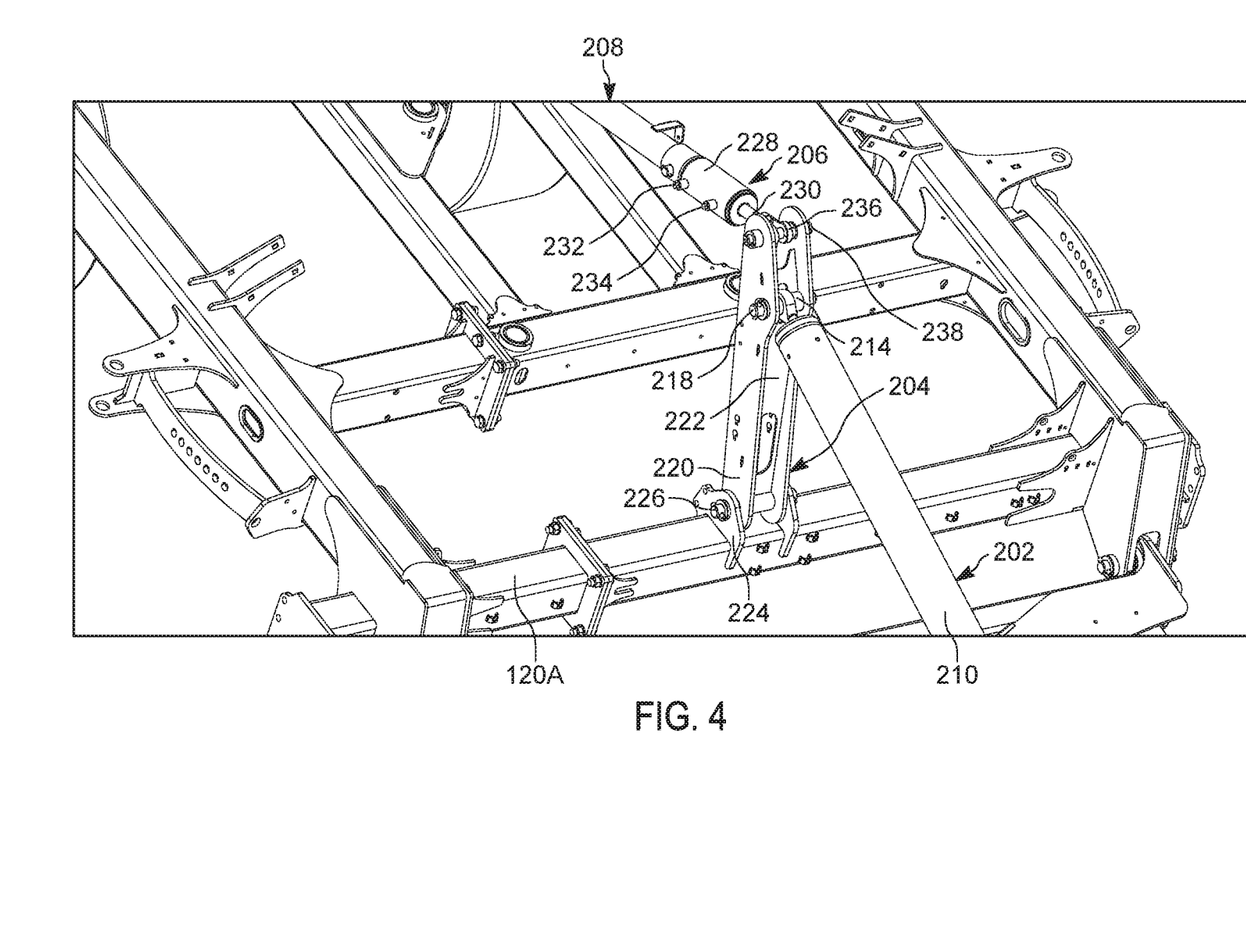
FIG. 4 is an enlarged, perspective view of a portion of the main frame section showing the leveling arm of FIG. 3.

As best shown in FIGS. 3 and 4, the main frame 102 can include a leveling assembly 200 that adjusts the position of the hitch assembly 104 to keep the work implement 100 level with the work vehicle as the frame sections are raised and lowered by the height adjustment actuators 126. The leveling assembly 200 includes a fore leveling link 202, a leveling arm 204, a leveling actuator 206, and an aft leveling link 208. As the center wheels 122 are raised and lowered, the movement of the rockshaft 140 and the leveling actuator 206 adjusts the position of the hitch assembly 104 relative to the main frame 102.

The fore leveling link 202 includes a substantially cylindrical body 210 having a first connector 212 extending from a first end and a second connector 214 extending from the second end. The first connector 212 is rotatably connected the hitch frame member 154. In an exemplary embodiment, the first connector 212 includes an eye bolt. A bracket and pin assembly 216 are connected to the hitch frame member 154 and the eye bolt rotatably connects to the pin. As best shown in FIG. 4, the second connector 214 is rotatably connected to the leveling arm 204. In an exemplary embodiment, the second connector 214 includes an eye bolt that is rotatably connected to the leveling arm 204 through a pin 218.

The first connector 212, the second connector 214, or both connectors can be adjustable so that the length of the fore leveling link 202 can be adjusted by a user. For example, the length of the first and second connectors 212, 214 extending from the cylindrical body 210 can be adjusted by a threaded connection. A collar or other implement can be threadably connected to the connector and rotated to linearly move the connector.

The leveling arm 204 has a substantially I-shaped cross-section with a pair of outer flanges 220 and an inner body 222 extending between the outer flanges 220. The leveling arm 204 is rotatably connected to the front lateral frame member 120A. The leveling arm 204 is positioned between a pair of brackets 224 connected to the front lateral frame member 120A, and a pin 226 extends through openings in the brackets 224 and the leveling arm 204. The second end of the leveling arm 204 receives the fore leveling link 202 and the leveling actuator 206.

The leveling actuator 206 is configured to extend and retract to adjust the length of the actuator 206, which adjusts the position of the leveling arm 204, fore leveling link 202, and the position of the hitch assembly 104. In an exemplary embodiment, the leveling actuator 206 is a dual-acting hydraulic actuator that includes a cylinder 228 and a piston 230 moveable relative to the cylinder 228. Hydraulic fluid lines (shown in FIGS. 1 and 2) are connected to a first inlet port 232 and a second inlet port 234 in the cylinder 228. The first inlet port 232 provides fluid communication to the cylinder 228 to retract the piston 230, and the second inlet port 234 provides fluid communication to the cylinder 228 to extend the piston 230. The exposed end of the piston 230 includes a yoke connector 236 that is rotatably connected to the leveling arm 204 by a pin 238 extending through openings in the yoke connector 236 and openings in the leveling arm 204. The second end of the leveling actuator 206 is connected to the aft leveling link 208.

As best shown in FIG. 3, the aft leveling link includes a substantially cylindrical body 240 having a first end connected to the leveling actuator 206 and a second end connected to the rockshaft 140. The aft leveling link 208 is positioned between a pair of cam brackets 242 that are rotatably fixed to the rockshaft 140. A pin 244 extends through openings in the cam brackets 242 and openings in the end of the aft leveling link 208 to rotatably connect the aft leveling link 208 to the brackets 242.

As the center wheel assemblies 122 are raised and lowered, the rockshaft 140 rotates. The rotation of the rockshaft 140 rotates the cam brackets 242, which causes the aft leveling arm 208 to pull away from, or push toward, the front lateral frame 120A. This motion causes movement of the leveling arm 204 and the fore leveling link 202, which rotates the hitch assembly 104. Additionally, the position of the piston 230 in the leveling actuator 206 can be adjusted to increase or decrease the distance between the rockshaft 140 and the leveling arm 204, further adjusting the position of the hitch assembly 104.

Figure 5:
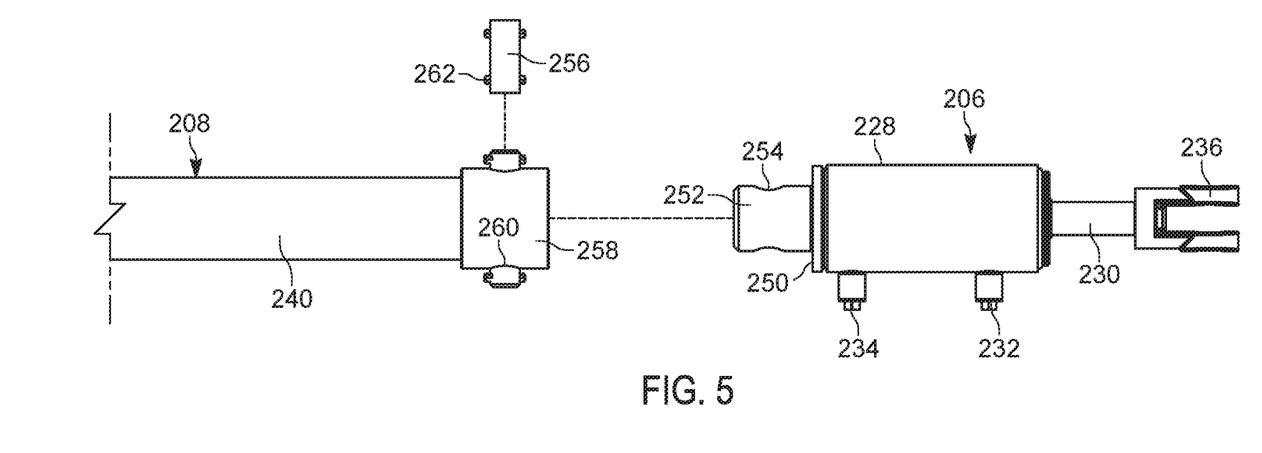
FIG. 5 is a top, assembly view showing the connection between the aft leveling link and the leveling actuator of FIGS. 3 and 4.
Figure 6:
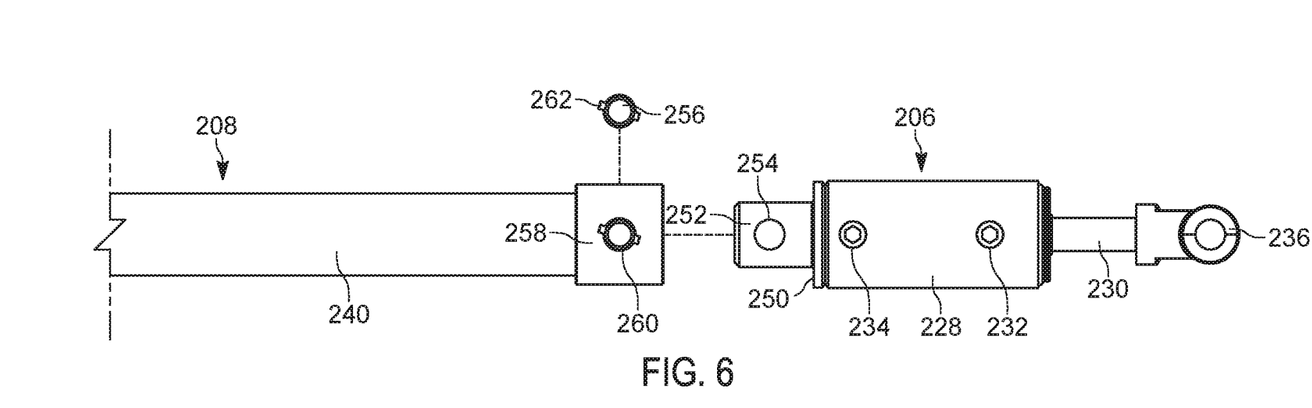
FIG. 6 is a side view of FIG. 5.

The leveling actuator 206 and the aft leveling link 208 are directly connected to, and engage one another. FIGS. 5 and 6 show an exemplary embodiment of the connection components between the leveling actuator 206 and the aft leveling link 208. The cylinder 228 of the leveling actuator 206 includes a base 250. A projection 252 extends from the base 250 and includes an opening 254 to receive a pin 256. The projection 252 is shown as cylindrical, although other shapes can be used. The first end of the aft leveling link 208 includes a collar 258 connected to the cylindrical body member 240. The collar 258 has an outer diameter that is approximately the size of the base 250, although the outer diameter can be smaller or larger than the base if required. The inner diameter of the collar 258 is sized to receive the projection 252. The collar 258 includes openings 260 that align with the projection openings 254.

Figure 7:
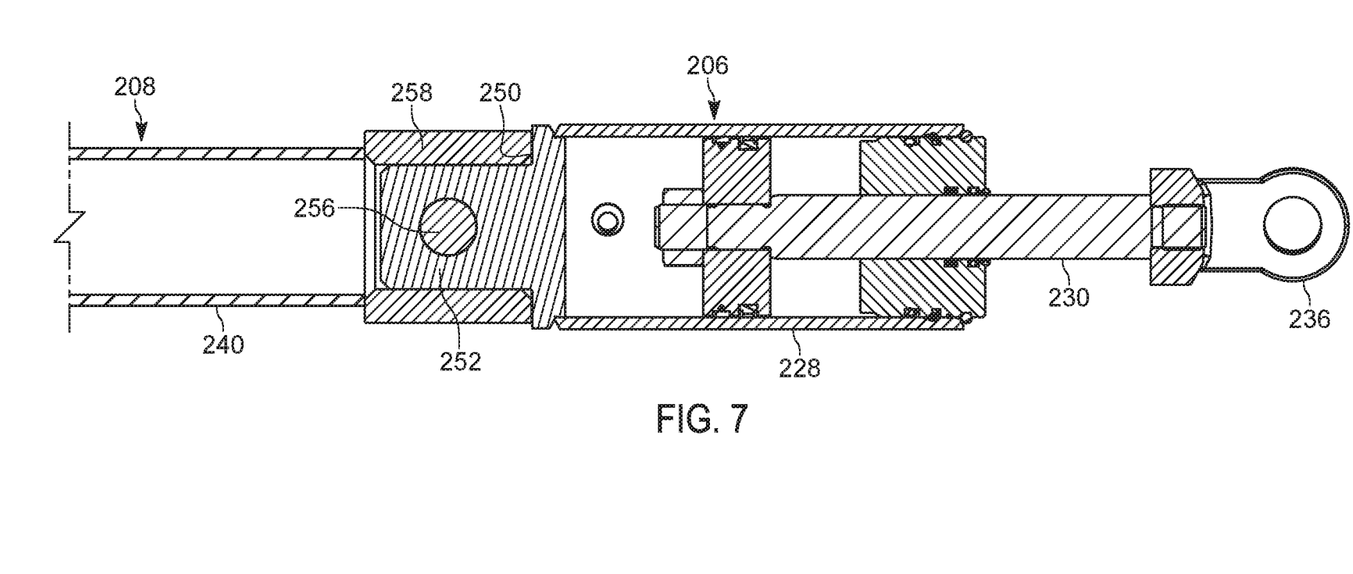
FIG. 7 is a side, sectional view showing the aft leveling link connected to the leveling actuator.

When assembled, the cylinder 228 is coaxially aligned with the collar 258 and the body member 240 of the aft leveling link 208. The projection 252 is inserted into the collar 258 and the pin 256 is placed through the collar openings 260 and the projection openings 254. The pin 256 can also include openings formed in its first end and second end. Cotters 262 can be secured (e.g. welding, friction fit, etc.) in the pin openings to prevent the pin 256 from being unintentionally dislodged.

During operation, the pin 256 receives most or all of the load in tension (when the aft leveling link 208 is being pulled away from the leveling actuator 206) while the base 250 and the collar 258 interact to transfer force in compression (when the aft leveling link 208 is being pushed toward the leveling actuator 206). Accordingly, the aft leveling link 208 substantially engages the leveling actuator 206. Used herein, the term "substantial engagement" includes a direct or substantially direct interaction between the components, which does not preclude the use of gaskets, pads, washers, spacers, or other minor components between the leveling actuator 206 and aft leveling link 208. Providing this connection results in less bowing and bending of the leveling actuator and the aft leveling link. The type and amount of components used in the connection are simplified so that servicing or replacing parts is easier. In some embodiments, the position of the leveling actuator can be changed in the order of the leveling assembly 200.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A tillage implement configured to be towed behind an agricultural vehicle, the tillage implement comprising:

an implement frame having a first lengthwise frame member, a second lengthwise frame member, and a lateral frame member connected to and extending between the first and second lengthwise frame members;

a hitch assembly rotatably connected to the implement frame;

a wheel assembly connected to the implement frame and moveable between a raised position and a lowered position;

a rockshaft rotatably connected to the implement frame and connected to the wheel assembly, wherein movement of the wheel assembly between the raised position and the lowered position causes rotation of the rockshaft; and a leveling assembly connected to the implement frame, the rockshaft, and the hitch assembly, wherein the leveling assembly is configured to adjust the position of the hitch assembly based on movement of the rockshaft, and wherein the leveling assembly includes an actuator connected to and aligned with a leveling link, wherein the actuator includes a piston and a cylinder and the cylinder includes a base and a projection extending from the base and into the leveling link.

2. The tillage implement of claim 1, wherein a pin extends through the leveling link and the projection.

3. The tillage implement of claim 1, wherein the leveling link includes a collar engaging the base.

4. The tillage implement of claim 1, wherein the leveling assembly includes a leveling arm connected to the implement frame and the actuator.

5. The tillage implement of claim 4, wherein the levelling assembly includes a fore leveling link connected to the hitch assembly and to the leveling arm.

6. The tillage implement of claim 4, wherein the leveling arm is rotatably connected to the lateral frame member.

7. The tillage implement of claim 1, wherein the hitch assembly is rotatably connected to the first lateral frame member and to the second lateral frame member.

8. The tillage implement of claim 1, wherein the actuator includes a dual-acting hydraulic actuator.

9. The tillage implement of claim 1, wherein the actuator substantially engages the leveling link.

10. The tillage implement of claim 1, wherein the leveling link includes a collar having an outer diameter equal to an outer diameter of the actuator.

11. A tillage implement configured to be towed behind an agricultural vehicle, the tillage implement comprising:

an implement frame;

a hitch assembly rotatably connected to the implement frame;

a wheel assembly connected to the implement frame and moveable between a raised position and a lowered position;

a rockshaft rotatably connected to the implement frame and connected to the wheel assembly, wherein movement of the wheel assembly between the raised position and the lowered position causes rotation of the rockshaft;

a fore leveling link connected to the hitch assembly;

a leveling arm connected to the fore leveling link and to the implement frame;

a leveling actuator connected to the leveling arm, the leveling actuator having a moveable piston extending from a first end and a projection extending from a second end; and an aft leveling link connected to the actuator and to the rockshaft, wherein at least a portion of the projection extends inside of the aft leveling link, wherein the position of the hitch assembly is adjusted based on movement of the rockshaft, and wherein the position of the hitch assembly is adjusted based on movement of the piston.

12. The tillage implement of claim ii, wherein the leveling actuator includes a base and the projection extends from the base into the aft leveling link.

13. The tillage implement of claim 12, wherein the aft leveling link includes a first set of openings and the projection includes a second set of openings aligned with the first set of openings.

14. The tillage implement of claim 13, wherein a pin extends through the first set of openings and the second set of openings.

15. The tillage implement of claim 14, wherein a cotter extends through the pin.

16. The tillage implement of claim 11, wherein the aft leveling link includes a collar having an outer diameter equal to an outer diameter of the actuator.

17. The tillage implement of claim 11, wherein the leveling arm is rotatably connected to the implement frame.

18. The tillage implement of claim 11, wherein a height actuator is connected to the wheel assembly to move the wheel assembly between the raised position and the lowered position.

19. The tillage implement of claim 11, wherein the actuator includes a dual-acting hydraulic actuator.

20. The tillage implement of claim 11, wherein the actuator substantially engages the leveling link.

* * * * *